United States Patent [19]

Carey et al.

[11] Patent Number: 5,500,127

[45] Date of Patent: Mar. 19, 1996

[54] PURIFICATION PROCESS

[75] Inventors: Richard J. Carey, Sherborn; James W. Thackeray, Braintree, both of Mass.

[73] Assignee: Rohm and Haas Company, Philadelphia, Pa.

[21] Appl. No.: 212,267

[22] Filed: Mar. 14, 1994

[51] Int. Cl.[6] .................................................. B01D 15/04
[52] U.S. Cl. .................................. 210/685; 210/686
[58] Field of Search ................................ 210/685, 686

[56]  References Cited

U.S. PATENT DOCUMENTS

| 3,849,306 | 11/1974 | Anderson | 210/685 |
| 4,548,717 | 10/1985 | Kunin et al. | 210/670 |
| 4,564,455 | 1/1986 | Flynn et al. | 210/686 |

FOREIGN PATENT DOCUMENTS

| 1228560 | 9/1989 | Japan . | |
| 93/12152 | 6/1993 | WIPO . | |

OTHER PUBLICATIONS

Samuelson, *Ion Exchange Separations In Analytical Chemistry*, John Wiley & Sons, New York, 1963, Ch. 2.

*Primary Examiner*—Ivars Cintins
*Attorney, Agent, or Firm*—Robert L. Goldberg

[57]  ABSTRACT

A process for the purification of an organic solution containing an acid labile material. The process comprises contact of the organic solution with a combination of a cation exchange resin and an anion exchange resin. The cation exchange resin has weak acidic groups to reduce attack on the acid labile material within the organic solution. The anion exchange resin preferably has hydroxide exchange groups. The combination of exchange resins yields counterions that form water in the solution treated upon contact with the solution with the exchange resin mixture.

11 Claims, No Drawings

PURIFICATION PROCESS

BACKGROUND OF THE INVENTION

1. Introduction

This invention relates to removal of dissolved contaminants from photoresist solutions containing acid-labile materials and more particularly, to the use of novel ion exchange procedures for the purification of photoresist solutions.

2. Description of the Prior Art

Ultra pure liquids free of particulate, ionic, and organic contamination are required for many industrial purposes such as for the manufacture of pharmaceuticals and integrated circuits. For example, in the manufacture of high resolution integrated circuits, it is known that many processing liquids come into contact with a bare wafer or a resist coated surface. These include photoresists and treatment chemicals such as organic liquids and aqueous solutions which contain acids, bases, oxidants, and other proprietary ingredients. At least 15 to 50 liquids of various compositions are used to clean wafers, prime surfaces, deposit resists or other polymers, and to develop, rinse, etch and strip the resist. It is known that these solutions may be a source of contamination of the integrated circuit wafer that may interfere with its performance. Thus, the reduction or removal of insoluble and soluble contaminants from processing fluids used for the production of integrated circuits before or during use is basic insurance for prevention of damage to the integrated circuit.

Photoresist coating compositions are used extensively in integrated circuit manufacture. Such compositions typically comprise a light-sensitive component and a polymer binder dissolved in a solvent. Typical photoresist compositions are disclosed in U.S. Pat. Nos. 5,178,986; 5,212,046; 5,216,111; and 5,238,776, each incorporated herein by reference for disclosure of photoresist compositions, processing, and use.

It is known that photoresist coating compositions contain particulate and ionic contaminants. For example, it is known that solid gels or insolubles form in photoresists due to dark reactions. In addition, soluble impurities such as moisture, silicone oils, plasticizers, and metal ions may be present from the manufacture of the resist components. In Class 100 clean rooms, airborne particulate counts amount to 3 particles per liter of density of 2. By comparison, liquids contain about 100,000 particles per liter. A particle count of 100,000 per liter seems high, but if translated into a solid of 0.6 µ in size, this is equivalent to 10 parts per million parts of solution (ppm). A level of 10 ppm amounts to the deposition of 10 mg. per liter. Since liquids are heavily contaminated compared to clean room air, effective contaminant removal is essential to the manufacture of such devices.

Ultrafiltration of resist liquids has progressed and manufacturers of resist now supply resist materials filtered through 0.04 µM diameter absolute filters. However, methods for removal of particulates from treatment solutions are not effective for removal of dissolved contaminants from solution such as organic impurities and ionic species. These contaminants can be at least as damaging to an integrated circuit as particulate contamination.

Efforts to remove dissolved cationic and anionic contaminants from treatment solutions used to manufacture integrated circuits are known in the art. For example, one such method is disclosed in International Publication No. WO 93/12152, incorporated herein by reference, which is directed to removing metal ions such as sodium and iron from novolak resins during manufacture. The process comprises cation exchange treatment whereby a cation exchange resin is first washed with a mineral acid solution to reduce the level of total sodium and iron ions within the exchange resin to preferably less than 100 ppb, passing a formaldehyde reactant through the so treated cation exchange resin to decrease the sodium and iron ion content to less than 40 ppb, passing a phenolic compound through the cation exchange resin to decrease its sodium and iron ion content to less than 30 ppb, and then condensing the so treated phenolic compound with formaldehyde in the presence of an acid catalyst to form the resin.

A method for removal of dissolved ionic metals and non-metals from a photoresist is disclosed in published Japanese Patent Application No. 1228560, published September 12, 1989, incorporated herein by reference. In accordance with the procedures of this patent, a photosensitive resin is passed through a mixed bed of a strong cation exchange resin and an anion exchange resin to simultaneously remove cation and anionic species from the photoresist solution.

The procedures of the prior art may be used to treat many, but not all photoresist compositions. In particular, the process of the prior art is unsuitable for treatment of photoresists that operate through an acid catalyzed reaction mechanism. Such photoresists generate a positive or negative image through a mechanism whereby a light-sensitive, photoacid generator (PAG), when struck by light, photolytically decomposes generating an acid that either causes a polymerization reaction in light-struck areas to produce a negative image, or causes cleavage of a pendant acid labile group to solubilize a polymer constituent of the photoresist in light-struck areas to produce a positive image. Examples of negative-acting, acid catalyzed photoresists are disclosed in EPO 0 232 972 and U.S. Pat. Nos. 5,210,000; 5,212,046; 5,229,254; and 5,234,791, each incorporated herein by reference for the disclosure of negative-acting acid catalyzed photoresist compositions and their use. Examples of positive-acting acid catalyzed photoresists are disclosed in U.S. Pat. Nos. 4,491,628; 5,229,256; and 5,258,257, each incorporated herein by reference for its teaching of positive photoacid generating photoresist compositions and their use.

In practice, it has been found that when prior art procedures are used to remove solution-soluble ionic contaminants from acid catalyzed photoresists of the type disclosed in the above-cited patents, strong acid groups of a cation exchange resin react with the PAG component of the photoresist formulation thus decreasing the PAG concentration in solution to a lower and unpredictable level. The decrease in PAG content results in batch-to-batch concentration variation in the resist. This in turn results in batch-to-batch variation in photoresist properties, especially photospeed. Batch-to-batch variations in properties are unacceptable to electronic device manufacturers.

Another problem with the process of the prior art involves the use of a strong anion exchange resin. Though the anion exchange resin removes contaminants from solution, it does so by an exchange reaction. The exchange reaction results in introduction of impurities into the photoresist that are exchanged with the anions of the anion exchange resin. Though the impurities introduced into the photoresist are more tolerable than the contaminants removed, any impurity in a photoresist is considered undesirable.

SUMMARY OF THE INVENTION

In accordance with the present invention, a process for purification of an acid catalyzed photoresist is provided where anion and cation impurities are reduced to low acceptable levels within the photoresist composition. In a preferred embodiment of the invention, the photoresist is treated with ion exchange resins without the introduction of contaminant counter-ions. The process of the invention utilizes cation and anion exchange resins, preferably in the form of a mixed bed. The cation exchange resin is one that has a $pK_a$ below that level where the acid group of the exchange resin would deleteriously react with the PAG component of the photoresist, and preferably, the counter-ion introduced into the photoresist following exchange is hydrogen. The anion exchange resin is desirably a strong anion exchange resin capable of removing anionic impurities from the photoresist solution with hydroxide counter-ions introduced into the photoresist solution following exchange. Through use of a cation exchange resin that yields a hydrogen counter-ion and an anion exchange resin that yields hydroxide counter-ions, only water is introduced into the photoresist. Water in minute concentration is not considered to be a photoresist contaminant.

DESCRIPTION OF THE PREFERRED EMBODIMENTS

The basic components of an acid catalyzed photoresist comprise a polymer and photoacid generator. In a typical positive-working system, the polymer contains pendant acid labile groups which insolubilize the polymer in developer. Photolysis of the photoactive generator results in liberation of acid. The acid attacks the pendant acid labile groups on the polymer cleaving the same from the polymer thereby rendering the polymer soluble in developer in the light-exposed areas of a photoresist coating. In a negative-acting system, the polymer is free of pendant acid labile groups and soluble in developer. The composition contains an acid activated crosslinking agent. To form an image in a coating formed from such a photoresist, photolysis of the PAG liberates the acid activating the crosslinking agent. This results in crosslinking of the photoresist and insolubilization of the polymer in light-exposed areas.

PAGs used in photoresists of the type described include the family of nitrobenzyl esters, and the s-triazine derivatives. Suitable s-triazine acid generators are disclosed, for example, in U.S. Pat. No. 4,189,323, incorporated herein by reference.

Non-ionic photoacid generators are suitable including halogenated non-ionic, photoacid generating compounds such as, for example 1,1-bis[p-chlorophenyl]-2,2,2-trichloroethane (DDT); 1,1-bis[p-methoxyphenyl]-2,2,2-trichloroethane; 1,2,5,6,9,10-hexabromocyclododecane; 1,10-dibromodecane; 1,1-bis[p-chlorophenyl]-2,2-dichloroethane; 4,4'-dichloro-1-(trichloromethyl) benzhydrol (Kelthane); hexachlorodimethyl sulfone; 2-chloro-6-(trichloromethyl)pyridine; 0,0-diethyl-0-(3,5,6-trichloro-2-pyridyl)phosphorothionate; 1,2,3,4,5,6-hexachlorocyclohexane; N(1,1-bis[p-chlorophenyl]-2,2,2trichloroethyl)acetamide; tris[2,3-dibromopropyl]isocyanurate; 2,2-bis[p-chlorophenyl]-1,1-dichloroethylene; tris[trichloromethyl]s-triazine; and their isomers, analogs, homologs, and residual compounds. Suitable photoacid generators are also disclosed in European Patent Application Nos. 0164248 and 0232972, both incorporated herein by reference.

Residual compounds are intended to include closely related impurities or other modifications of the above halogenated organic compounds which result during their synthesis and may be present in minor amounts in commercial products containing a major amount of the above compounds.

Acid generators that are particularly preferred for deep UV exposure include 1,1-bis(p-methoxyphenyl)-2,2,2-trichloroethane (DDT); 1,1-bis(p-chlorophenyl)-2,2,2-trichloroethanol; tris(1,2,3-methanesulfonyl)benzene; and tris(trichloromethyl)triazine.

A particularly suitable group of acid generating compounds useful in the compositions of the invention are the iodonium salts. A preferred group of iodonium salts are those resulting from the condensation of aryl iodosotosylates and aryl ketones as disclosed, for example, in U.S. Pat. No. 4,683,317, incorporated herein by reference.

Another group of suitable acid generators is the family of sulfonated esters including sulfonyloxy ketones. Suitable sulfonated esters have been reported in *J. of Photopolymer Science and Technology*, Vol. 4, No. 3, 337–340 (1991), incorporated herein by reference, including benzoin tosylate, t-butylphenyl alpha-(p-toluenesulfonyloxy)-acetate, and t-butyl alpha(p-toluenesulfonyloxy)-acetate.

For the most part, essentially all of the PAGs described above are subject to attack by strong acids. Therefore, prior art cation exchange methods used to purify photoresists are not suitable for purification of photoresists using these PAGs. To avoid attack of a cation exchange resin on an acid-sensitive material such as the above-described PAGs, it is desirable to use a cation exchange resin having a $pK_a$ not exceeding 5 and more preferably not exceeding a $pK_a$ of 3.5. Preferred cation exchange resins are those having carboxylic acid substitution such as exchange resins of methacrylic acid-divinyl benzene copolymers and polyacrylic acid having carboxylic acid substitution. It should be noted that ion exchange resins of this type often are supplied with alkali metal counter ions. Those ion exchange resins having metallic counter ions are unacceptable for purposes of this invention as it is an object of this invention to introduce only hydrogen ions into the photoresist solution to be purified. Commercially available cation exchange resins suitable for purposes of this invention include the DUOLITE® ion exchange resins identified as C-433 and C-464 ion exchange resins and those ion exchange resins identified as the AMBERLITE® ion exchange resins identified as IRP-64, IRP-88, IRC-50, IRC-50S, and C-464 ion exchange resins, all available from Rohm and Haas Company. In accordance with the preferred embodiment of this invention, the AMBERLITE IRC-50 cation exchange resin is most preferred.

To remove dissolved anions from the photoresist solution such as halides, phosphates, nitrates, chromates, borates, or other materials that can function as a dopant in an integrated circuit, the photoresist solution is also treated with an anion exchange resin. Suitable anion exchange resins are known in the art and disclosed, for example, in Japanese published Patent Application No. 1228560 (published Sep. 12, 1989), incorporated herein by reference, and in Samuelson, *Ion Exchange Separations In Analytical Chemistry*, John Wiley & Sons, New York, 1963, Ch. 2, also incorporated herein by reference. In order to prevent contaminant introduction through the exchange process, the preferred anion exchange resins are those resins having the hydroxide counter ion whereby hydroxide is introduced into the photoresist composition during the exchange process. Hence, preferred anion exchange resins are resins having structurally bound quaternary ammonium hydroxide exchange groups such as polystyrene-divinyl benzene resins substituted with tetramethylammoniumhydroxide. A preferred anion exchange resin is crosslinked polystyrene having quaternary ammoniumhydroxide substitution such as those ion exchange resins sold under the trade names AMBERLYST® A-26-OH by Rohm and Haas Company and DOW G51-OH by Dow Chemical Company.

In accordance with the most preferred embodiment of the invention, the photoresist is treated with a combination of a cation exchange resin having carboxylic acid exchange groups and an anion exchange resin having quaternary ammonium hydroxide exchange groups. Using this procedure, during the exchange process, only water in minute amount is introduced into the photoresist composition.

The photoresist may be passed through the cation exchange resin and the anion exchange resin sequentially or through a mixed bed of the two. Passage through a mixed bed is preferred. Whether sequentially or in a mixed bed, the overall ratio of the cation exchange resin to the anion exchange resin is not critical and may vary from 10:90 to 90:10. Preferably, the ratio of the cation exchange resin to the anion exchange resin varies between 25:75 and 75:25 and more preferably, between 40:60 and 60:40.

The method used to treat the photoresist with the ion exchange resins in accordance with this invention is not critical. Preferably, the ion exchange resins are first rinsed with deionized water to remove any residual manufacturing contaminants present in the bed or column of exchange resin. Rinsing conditions are not critical and it is sufficient to pass the rinse water through the bed of exchange material in a column or to slurry the rinse water with the exchange resin. Contact time between the exchange material and the rinse water may vary between about 1 and 30 hours, more preferably, from about 1 to 10 hours. The so treated resin is then preferably dehydrated by washing the resin with an aqueous miscible organic solvent such as ethyl lactate, acetone, diglyme, or a solvent common to a photoresist solution to be purified.

The photoresist solutions treated with the ion exchange resin in accordance with the invention may be by slurrying the same with the resin or passing the solution through a column of the exchange material. The rate of passage of the solution through the column can vary anywhere between about 2 and 20 bed volumes per hour. Ambient conditions are suitable. This procedure can be performed at room temperature or elevated temperature, though elevated temperatures result in increased exchange efficiency, but with possible concomitant degradation of temperature sensitive materials.

EXAMPLE 1

This example illustrates the method of preparing a column of ion exchange resin in accordance with the invention.

The exchange resin selected comprised a mixture of a weak cation resin having carboxylic acid functionality identified as IRC-50 exchange resin and an anion exchange resin having quaternary ammonium hydroxide functionality identified as IRA-35 resin, both available from Rohm and Haas Company. Fifty grams of each resin were weighed into a 1-liter polyethylene beaker. Then, 300 ml. of diglyme were added to the beaker and swirled to completely wet and mix the exchange resins. The mixture was permitted to stand for 30 minutes and then the rinsing procedure was repeated several times to ensure that all water had been displaced from the resin mixture. A glass column measuring 60 cm. in length and 2.5 cm. in diameter was used as an exchange column. The column was fitted with Teflon fittings and lines.

The resin mixture in diglyme was shaken to form a slurry and the slurry added to the column to fill about three-quarters of its length. The diglyme was permitted to drain from the column.

EXAMPLE 2

A photoresist was prepared having the following formulation:

| | |
|---|---|
| Solvent (diglyme) | 72.00 |
| Poly-(P-vinyl phenol) 10% hydrogenated | 24.90 |
| Hexa(methoxymethyl melamine)[1] | 1.86 |
| Photoacid generator[2] | 1.24 |

[1]Cymel 303 (American Cyanamid Co.
[2]tris(2,3-dibromopropyl)isocyanurate

The above photoresist was analyzed and found to have sodium in a concentration of about 130 ppb, iron in a concentration of about 40 ppb, and other metallic contaminants in a concentration of about 20 ppb.

The photoresist was spin-coated onto bare silicon wafers (vapor-primed with HMDS for 5 minutes) at 4000 rpm for 30 seconds, then softbaked at 100° C. for 60 seconds on a vacuum hotplate, yielding a film of approximately 1 micron thickness. An array of 7×7 mm. sq. regions ("pads") was exposed over a range of exposure energies from 4 to 124 $mJ/cm^2$ in steps of 4 $mJ/cm^2$, using a GCA AWIS excimer laser stepper at a wavelength of 248 nm. The coated wafers were then baked ("post-exposure bake") at 100° C. for 60 seconds on a vacuum hotplate to bring about an acid catalyzed crosslinking reaction, and the photoresist was then developed by immersion in MICROPOSIT® MF®-312 developer at a concentration of 0.135N for 150 seconds at 25° C. with hand stirring. After rinsing and drying, the thickness of each pad was measured with a Nanospec/AFT instrument. At the lowest exposure doses, the actinic energy was insufficient to crosslink the resist and the resist was completely removed by the developer. Above 16 $mJ/cm^2$ crosslinking proceeded sufficiently to partially insolubilize the exposed portions of the photoresist, and above 80 $mJ/cm^2$ the photoresist was rendered completely insoluble so that the original film thickness was retained.

EXAMPLE 3

The photoresist of Example 2 was passed through the column prepared in accordance with Example 1 at a flow rate of about 5 bed volumes per hour. Following treatment with the ion exchange resin, the sodium ion content had been reduced to about 15 ppb, the iron ion content reduced to about 25 ppb, and the total of all other metallic ion contaminants had been reduced to less than 10 ppb. Repetition of the coating and exposure procedures as set forth in Example 2 resulted in substantially the same photolithographic properties indicating that the photoacid generator content had not been signficantly altered by treatment with the ion exchange resin.

We claim:

1. A method for removal of cationic and anionic contaminants from an organic solution of an acid catalyzed photoresist composition containing one or more acid labile components subject to reaction in the presence of a strong acid, said process comprising the steps of providing said organic solution containing said one or more acid labile components, providing a weak acid cation exchange resin having a $pK_a$ such that the weak acid exchange groups on said resin do not react with acid labile components of the photoresist, providing a strong base anion exchange resin, and contacting said organic solution with said cation exchange resin and said anion exchange resin for a time sufficient to remove essentially all dissolved contaminants from solution without causing reaction between said acid labile components of the photoresist composition and said cation exchange resin.

2. The process of claim 1 where the cation exchange resin is one having carboxylic acid exchange groups as a source of hydrogen ions for exchange with metallic ions upon contact of the organic solution with the exchange resin.

3. The process of claim 1 where the photoresist solution comprises a polymer binder and a photoacid generator.

4. The process of claim 3 where the photoresist is a negative-acting photoresist containing an acid activated crosslinking agent.

5. The method of claim 1 where the cation exchange resin and the anion exchange resin are dehydrated by contact with an aqueous miscible organic solvent prior to contact with the solution of the photoresist.

6. The process of claim 5 where the anion exchange resin is a strong base anion exchange resin where hydroxide ions are exchanged for metallic ions upon contact of the organic solution with the exchange resin.

7. The process of claim 6 where the anion exchange resin is one having quaternary ammonium hydroxide exchange groups.

8. The process of claim 5 where the cation exchange resin is one where hydrogen ions are exchanged for metallic ions upon contact of the organic solution with the exchange resin and the anion exchange resin is one where hydroxide ions are exchanged for metallic ions upon contact of the organic solution with the exchange resin.

9. The process of claim 8 where the photoresist is passed sequentially through the cation exchange resin and then the anion exchange resin.

10. The process of claim 8 where the photoresist is passed through a mixed bed of the cation exchange resin and the anion exchange resin.

11. The process of claim 10 where the photoresist solution is positive-acting and comprises a polymer binder having terminal acid labile groups in sufficient concentration to prevent development in a photoresist developer.

* * * * *